Aug. 22, 1944.     G. J. WEISSENBERG     2,356,553
PROCESS TO LOWER THE REFLECTION OF OPTICALLY ACTIVE SURFACES
Filed Oct. 24, 1940
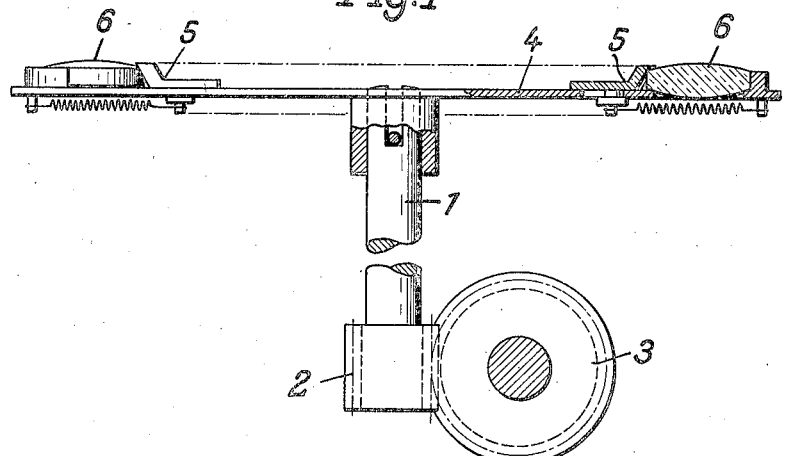
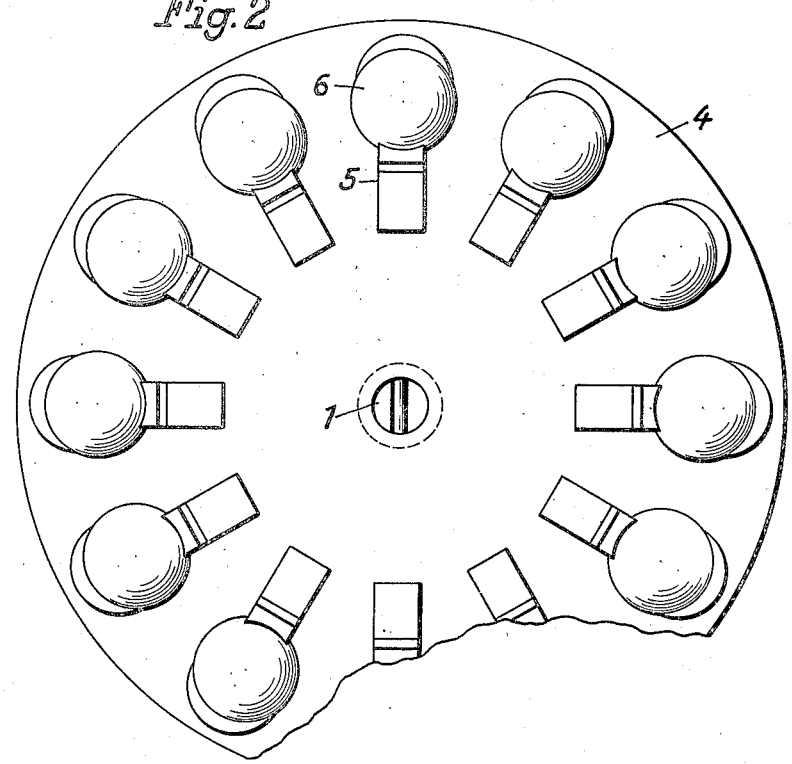
INVENTOR
Gustav J. Weissenberg
BY
ATTORNEY Patented Aug. 22, 1944

2,356,553

UNITED STATES PATENT OFFICE 2,356,553

PROCESS TO LOWER THE REFLECTION OF OPTICALLY ACTIVE SURFACES

Gustav Joseph Weissenberg, Berlin-Mariendorf, Germany; vested in the Alien Property Custodian Application October 24, 1940, Serial No. 362,540
In Germany November 17, 1939

3 Claims. (Cl. 117—124)

The present invention relates to a process to lower the reflection of optically active surfaces and to an apparatus for carrying out this process. By optically active surfaces are to be understood the surfaces of optical lenses, prisms, plates, etc., made of different sorts of glass or other transparent materials, such as calcspar, fluorspar, rock salt, quartz, quartz glass, synthetic materials and so forth, as well as surfaces of other reflecting bodies. The process is meant to enhance the light transmission of optical systems and to lower disturbing reflections.

Different processes to lower the reflection of optically active surfaces are known. Thus, for instance, the reflection can be lowered by chemical means, such as the etching of articles of glass, for instance lenses, with acids, hydrogen sulphide, ammonium sulphide or similar compounds. The reflection can be also lowered by physical means, in that the said surface, for instance a glass surface, is coated by a foreign layer. Thus it is known to evaporate for instance fluorides, such as calcium fluoride on glass lenses or other optical bodies.

The known methods have the disadvantage that the adherence of foreign layers thus deposited on the optically active surfaces is not very great so that they can be mostly removed by light rubbing. Besides, layers such as alkali fluoride layers, deposited by known methods have an unsatisfactory resistance against atmospheric components such as water vapour, carbon dioxide and oxygen. When the coating of optically active surfaces by known methods takes place by evaporating substances, for instance calcium fluoride and the like on the surfaces, these methods are rather complicated and expensive. The etching on the other hand has the disadvantage that it is extremely difficult to obtain in this way uniform layers of a determinated thickness.

It is therefore also the object of the present invention to obtain especially strongly adhering, chemically resistant, uniform layers in a simple manner.

According to the invention the optically active surfaces are first thoroughly cleaned so that layers of dirt, especially layers of greasy dirt, are removed. After that the surfaces are wetted with a solution containing silicic acid, for instance by immersion, sprinkling or spraying and, if desired, dried. Afterwards the surface prepared in the above-mentioned way is treated with an agent, which precipitates the silicic acid. The components of the layer other than silicic acid obtained on the optically active surfaces are then washed off. Preferably the precipitant, for instance hydrochloric acid, is used dissolved in a solvent such as water, which would be at the same time also a good solvent for the layer components others than silicic acid, so that the precipitation of the silicic acid and the dissolving of the components others than silicic acid, could be carried out in one operation.

The thickness of the layer deposited on the optically active surfaces has to be such that the optical reflection coefficient of this surface becomes a minimum. A statement as to the value of the layer thickness cannot be made, and that because of the following theoretical reflections.

The manner in which such layers lower the reflection is still not absolutely cleared up. According to the electrodynamic the reflecting power $\rho_0$ is expressed by the following well-known formula, which was confirmed by the experiment:

$$\rho_0 = \left(\frac{n_2 - n_1}{n_2 + n_1}\right)^2$$

Herein $n_1$ and $n_2$ mean the refraction indexes of the mediums which meet at the optically active surface, for instance air and glass. By coating the glass with an intermediary foreign layer with the refraction index $n_f$, i. e., bringing it between both mediums, the light which from medium 1 enters into medium 2 undergoes two reflections, one on the interface air-intermediary layer and one on the interface intermediary layer-glass. Strictly speaking one part of the light reflected on the interface intermediary layer-glass will be rereflected on the interface air-intermediary layer. This process is known, also its influence on the total result, but for the sake of the simplicity of the description it will be disregarded.

On the interface air-intermediary layer the fraction of the incident light:

$$\rho_1 = \left(\frac{n_f - n_1}{n_f + n_1}\right)^2$$

and on the interface intermediary layer-glass the fraction:

$$\rho_2 = \left(\frac{n_2 - n_f}{n_2 + n_f}\right)^2$$

will be reflected. On both interfaces together therefore the fraction:

$$S = \rho_1 + \rho_2(1 - \rho_1)$$

of the incident light will be reflected. Hereby the factor $1 - \rho_1$ can be neglected.

In general, especially when the intermediary layer is thin, this sum does not represent the reflection coefficient, but, as follows from the theory of colours of thin plates, interference processes take place. According to this theory the intensity of the reflected light can become even equal to zero and that when the amplitudes of the train of waves, reflected on the fore and on the back surface of the intermediary layer have equal values and when their phases have a mutual difference of half a wave length. As known, the first condition requires that $n_f$ follows the equation:

$$n_f = \sqrt{n_1 n_2}$$

The proper value of $n_f$ lays therefore between $n_1$ and $n_2$. Under this assumption the thickness $d$ follows the condition:

$$d = \frac{1}{4}\frac{\lambda}{n_f} + \frac{k}{2}\frac{\lambda}{n_f}$$

where $\lambda$ means the wave length in the vacuum and $k$ a full positive number or zero. As known, the greater $k$ the smaller the wave range, for which this relation can be sufficiently fulfilled. If $n_f$ would lay outside the values of $n_1$ and $n_2$ there would have been the phase discontinuity also to be considered.

In the case of air-glass the refraction index of the intermediary layer must be:

$$n_f = \sqrt{1.5 \cdot 1} = 1.22.$$

Substances with so small a refraction index are not known. But it is possible to cover the glass, etc., by special processes with coatings, which behave from this point of view in such a manner, as if they would consist of a substance with a corresponding $n_f$. Such coatings are perhaps in the state of a submicroscopical loosening and behave therefore with regard to light as a medium with abnormally small refraction indexes.

Up to date no experimental means for a sure clearing up of these problems exist. There is especially no possibility to measure the thickness of such coatings without relying on assumptions, which themselves are still uncertain. With regard to the refraction index $n_f$ of the intermediary layer there is in so far a difficulty, as the homogeneous behaviour of the layer in its whole thickness is uncertain or even unprobable. It could be very well denser on the glass side than on the air side. Hereby the above-named conditionally equations for the refraction index and the thickness of the intermediary layer lose in reality their sense. For the practical obtaining of the right thickness one is obliged, when using known processes in which substances are evaporated on the glass, to produce layers of different thickness, for instance by varying the quantity of the evaporated substances. That thickness which causes the smallest reflection is the right one. With regard to the kind of the intermediary layer one is even in a more difficult position. As no substances with a $n_f = 1.22$ are at our disposal one is obliged to use substances, which as such possess a greater refraction index and to apply them in such a manner that at an appropriately chosen thickness they would be able to lower the reflection as far as possible. A direct measurement of the refraction index or of its course is not possible and only in the rarest cases would it be possible to obtain a state in which the amplitude of the light, reflected on the fore surface of the coating, would be equal to the amplitude of the light, reflected on its back surface.

It would be best, if each of the two amplitudes would equal zero, as in such a case, independently of the thickness of the intermediary layer no reflection at all would take place. To obtain that the refraction index of the intermediary layer on the air side must be equal to the refraction index of the air and rise to the value of the refraction index of the glass on the glass side in a continuous way (a monotonous way is not required). In reality the reflection coefficient will be influenced by both interference processes and changes of the refraction index of the intermediary layer. A separate measurement of the single influences is as yet impossible. Therefore the properties of the intermediary layer, which are necessary for a widest lowering of the reflection can be described only by statements as to their total effect on the reflection. In this way also the multiple reflections on both interfaces of the intermediary layer will be considered. A specification of the layer thickness in cm. has no significance.

For carrying out the process according to the invention, beside silicic acid also related substances, especially those belonging to the 4th group of the periodic system, which will give solid, insoluble and in a thin layer transparent compounds with oxygen, as for instance titanic acid, zirconium dioxide or stannic acid, are suitable. The said compounds can be used in the form of water-soluble salts, especially alkaline salts. By the addition of inorganic acids, such as sulphuric acid, hydrochloric acid, phosphoric acid, nitric acid and the like, of organic acids, such as formic acid, acetic acid, propionic acid, lactic acid, tartaric acid, citric acid, benzene sulphonic acid and the like, or by the addition of acid salts, such as potassium bisulphate, bisulphites and so on, the silicic acid or the analogous compounds can be precipitated on the optically active surfaces. By using the salts of the corresponding polyacids, such as polysilicates a precipitation can be also obtained by means of organic solvents, such as ethyl alcohol.

The silicic acid and its analogous compounds can be used also in another form, such as silicon tetrachloride, stannic chloride, zirconium sulphate and the like. These compounds are, for instance, dissolved in organic solvents and the surfaces, which are to be coated, then wetted with the said solutions. The precipitation of the silicic acid or the analogous compounds on the optically active surfaces is then obtained by treating them with water, alkalis or the like.

Finally the silicic acid, etc., can be also used in the form of organic complex compounds, as for instance the dimethylamino guanidine silicate.

The process according to the invention is therefore, generally speaking, carried out in that the optically active surfaces are wetted with the solution of a substance, out of which an insoluble compound of the general formula $MeO_2 \cdot xH_2O$ can be precipitated. In this formula Me means an element of the 4th group of the periodical system. As it is known that the said oxygen-containing compounds of the elements of the 4th group of the periodical system are able to form diverse hydrates, $x$ may mean any number. These compounds can be also obtained in the water-free form, especially after being appropriately dried. After the precipitation those components of the layer deposited on the optically active surfaces, which do not contain silicic acid or the like, are removed by a thorough washing. Salts, which are, for instance, formed by reacting the alkaline silicates with acids or by decomposing the silicon tetrachloride or the stannic chloride with alkalis, are removed. The washing process can be in general carried out with water, but organic solvents, such as alcohol may also be used.

According to the desired layer thickness the new treatment process can be carried out once or several times. Although the thickness of the layer can be varied in wide limits without losing its reflection lowering property, an optimum of the layer thickness still exists. Hereby it remains, according to the above-said, undecided, how far this optimum is founded on the layer thickness itself or on the changes of the reflection coefficient, as influenced by the change of the thickness.

Beside by a repetition of the treatment according to the invention the desired layer thickness can be also obtained by using appropriate concentrations of the solution with which the said surfaces are wetted.

The mechanical resistance of the layers obtained on the optically active surfaces can be increased by a subsequent thermical treatment, such as a heating at high temperatures, amounting, for instance for articles of glass, to about 200–750° C. If the deposition of the layer is obtained by several repetitions of the treatment according to the invention, then the heating is appropriately carried out after each treatment.

Layers with an especially high reflection lowering effect are obtained when a partial liberation of the silicic acid or the analogous compounds, and that in the form of colloids, takes place already in the solutions, with which the optically active surfaces are wetted. This can be obtained, for instance, by the addition of weakly acidic agents, such as salts of the monobasic oxyacids or of salt mixtures, especially of the ammonium salts of such acids. Moreover phthalic acids, phthalic acid imides, polyvalent phenols, such as resorcine and phloroglucine are also appropriate. High molecular aliphatic alcohols, such as octylic and nonylic alcohol can be also used. The colloidal properties of the silicic acid or of its analogous compounds can be widely influenced by the selection of appropriate quantities of the said substances, of the temperature and the concentration of the starting solutions. The solutions thus obtained are then used for the wetting of the optically active surfaces and the precipitation of the silicic acid and the like subsequently completed in the above-mentioned manner.

The solutions with which the optically active surfaces are to be wetted must possess a determinated degree of aging, as the liberated silicic acid and the like, remains in the highly dispersed state in the solutions only for a limited time. By the addition of an appropriate protective colloid one is able to enhance the length of time, in which such solutions may be used. As such protective colloids may be named gum-arabic, tragacanth, dextrine, sodium oleate and the like.

In accordance with the said measures, for instance, layers with an especially high reflection lowering effect can be obtained in the following manner.

100 g. of sodium silicate, containing 3.6 mol of silicic acid per mol of alkali are dissolved in 2.5 liter of water and 75 cc. of a 50% solution of ammonium lactate and 0.2 g. of sodium oleate added at room temperature. After a preliminary thorough degreasing, the optically active surfaces to be treated are immersed for a short time in the said solution and the excess of liquid then removed by centrifugal force. After drying the surfaces are for 30 minutes treated with a 30% solution of nitric acid at a bath temperature of 60° C. Afterwards they are thoroughly washed with water.

The improvement resulting from the process according to the invention is clear from the fact that, for instance, in the case of a glass with a refraction index of 1.64 the light loss through reflection of a surface amounts to about 0.1% when the surface is, for instance, coated with a layer in the above-mentioned way, whilst the light loss of an untreated surface amounts to about 6%.

The mechanical resistance, for instance the scratch resistance, of the layer, obtained by the process according to the invention can be greatly increased when dioxane or furane derivatives, such as furfurol, are added to the solutions, with which the surfaces are wetted. Beside ammonium lactate and sodium oleate also 10 cc. of dioxane can be added to the above-named solution. Thereby the hardness of the layers is excessively increased.

A hardening of the layers to be deposited on the optically active surfaces can be also obtained when, following the treatment according to the invention, the surfaces to be worked are coated with an extremely thin protective layer, consisting of silicic acid or the like. This is carried out in such a manner that the surfaces coated by reflection lowering layers are subjected for a second time to a treatment according to the invention; hereby however a solution of sodium silicate or the like of a very small concentration is to be used. For the obtaining of such thin, especially hard layers, for instance solutions of sodium silicate containing 10 g. of the silicate per liter of water, have been found especially appropriate.

The reflection lowering layers obtained by the process according to the invention possess not only a strong adherence but are also absolutely resistant against the action of usual acids, with the exception of hydrofluoric acid and hot phosphoric acid, as well as against the action of the atmosphere. They are not sensitive to the influence of temperature.

To ease the obtaining of reflection lowering layers of an absolutely constant thickness it is advisable to centrifuge the surfaces wetted with the treatment solutions before the precipitation of silicic acid is carried out. To obtain that, the surface wetted with the solutions of sodium silicate or the like are in the wet condition transferred into a centrifuge. In accordance with its number of revolutions and the duration of the centrifugal treatment used, layer thicknesses of an absolutely predetermined value can be obtained.

The centrifuge used has preferably exchangeable liners, which are provided with a considerable number of devices to fasten the objects to be treated. The said objects are placed as far as possible from the axis of rotation of the centrifuge to prevent those points of them, which are remotest from the axis, from being subjected to a far greater centrifugal force, than the points which are nearer to the axis.

The appended diagrammatic figures show, for instance, an apparatus in which the process according to the invention can be carried out.

Fig. 1 shows the centrifuge to be used and Fig. 2 an exchangeable liner for the centrifuge in top view.

As apparent from Fig. 1 the axis of rotation 1 of the centrifuge is driven by means of a gear 2 and a worm 3. The exchangeable liner of the centrifuge, which possesses claws 5 for the fastening of the objects 6, is designated by 4.

The mechanically cleaned objects are fixed in the claws 5, are then degreased, for instance with hydrogen peroxide, washed with distilled water and dried. Afterwards the liner 4 is immersed in the treatment solution, containing, for instance sodium silicate, subsequently placed in the centrifuge and at once centrifuged. After that the liner is taken off the centrifuge, the objects dried and the silicic acid or the like subsequently precipitated. But it is also possible after drying the objects to immerse them again once or several times and to obtain thus a further precipitation. The precipitation of the silicic acid is carried out by immersing the liner 4 with the objects to be treated for a longer time, preferably under slow rotation, immersed in a bath of acid or alcohol. When the precipitation of the silicic acid or the like has taken place the objects are washed with water and dried. Only afterwards they are taken out of the liner. Thus in neither stage of the treatment are they touched with hands.

It has been found that it enhances the mechanical effect of the centrifugal process to add substances to the solutions with which the objects are wetted, which would diminish their surface tension. So for instance, soaps, alkylated aromatic sulphonic acids, such as isopropyl naphthalene sulphonic acid and other known agents for the diminishing of the surface tension can be added to the treatment solution. When using the isopropyl naphthalene sulphonic acid the addition of 15 cc. of a saturated solution per liter of the treatment solution has been found especially appropriate. When applying such a solution the speed of the centrifuge is preferably so regulated that the objects to be treated may have a mean circumferential speed of between 10 and 100 m. per second at a radius of the circuit of 20 cm. Under these conditions a duration of the centrifugal process of 1-3 minutes has been used. To avoid drops adhering during the centrifugal process to the ends of the immersed objects, which are remotest from the axis of rotation, it is advisable to fasten them in the centrifuge in such a manner that their optically active surfaces would on the outer edge meet the holder without gap or stage.

What I claim is:

1. A process of providing on a surface of a transparent article a thin, transparent layer of the character which affects the reflection of light incident on said surface, comprising rendering said surface substantially clean and free of dirt, grease and foreign substances, wetting the surface with an aqueous solution of an alkali silicate containing a compound selected from the group consisting of furfurol and dioxane, removing the excess wetting solution to leave a thin layer of wetting solution on said surface, drying the said layer, reacting the said layer with a stronger acid to precipitate silicic acid, washing said layer to remove reaction products other than silicic acid and drying said layer to form a transparent silica coating of increased scratch resistance.

2. The process as set forth in claim 1 wherein the alkali silicate solution contains furfurol.

3. The process as set forth in claim 1 wherein the alkali silicate solution contains dioxane.

GUSTAV JOSEPH WEISSENBERG.